United States Patent
Fathi et al.

(10) Patent No.: US 10,032,310 B2
(45) Date of Patent: *Jul. 24, 2018

(54) METHODS AND SYSTEMS FOR WIREFRAMES OF A STRUCTURE OR ELEMENT OF INTEREST AND WIREFRAMES GENERATED THEREFROM

(71) Applicant: Pointivo, Inc., Atlanta, GA (US)

(72) Inventors: Habib Fathi, Atlanta, GA (US); Daniel L. Ciprari, Atlanta, GA (US); William Wilkins, Jr., Suwanee, GA (US)

(73) Assignee: POINTIVO, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,703

(22) Filed: Aug. 22, 2017

(65) Prior Publication Data
US 2018/0053347 A1 Feb. 22, 2018

Related U.S. Application Data

(60) Provisional application No. 62/377,819, filed on Aug. 22, 2016.

(51) Int. Cl.
*G06T 17/20* (2006.01)
*G06T 7/33* (2017.01)
*G06T 7/60* (2017.01)

(52) U.S. Cl.
CPC ............ *G06T 17/205* (2013.01); *G06T 7/344* (2017.01); *G06T 7/60* (2013.01); *G06T 2200/04* (2013.01);
(Continued)

(58) Field of Classification Search
CPC ......... G06T 17/20; G06T 15/04; G06T 17/00; G06T 17/05; G06T 2200/08;
(Continued)

(56) References Cited

U.S. PATENT DOCUMENTS

| 8,982,118 B2 | 3/2015 | Richards, Jr. |
| 9,002,719 B2 | 4/2015 | Tofte |

(Continued)

OTHER PUBLICATIONS

Dorninger, P. & Nothegger, C., "3D Segmentation of Unstructured Point Clouds for Building Modelling". International Archives of Photogrammetry, Remote Sensing and Spatial Information Sciences. (2007) 36(3/W49A) 191-196.

(Continued)

*Primary Examiner* — Haixia Du
(74) *Attorney, Agent, or Firm* — Thomas | Horstemeyer, LLP

(57) ABSTRACT

The disclosure relates to systems and processes for generating verified wireframes corresponding to at least part of a structure or element of interest can be generated from 2D images, 3D representations (e.g., a point cloud), or a combination thereof. The wireframe can include one or more features that correspond to a structural aspect of the structure or element of interest. The verification can comprise projecting or overlaying the generated wireframe over selected 2D images and/or a point cloud that incorporates the one or more features. The wireframe can be adjusted by a user and/or a computer to align the 2D images and/or 3D representations thereto, thereby generating a verified wireframe including at least a portion of the structure or element of interest. The verified wireframes can be used to generate wireframe models, measurement information, reports, construction estimates or the like.

18 Claims, 2 Drawing Sheets

(52) U.S. Cl.
CPC ...... *G06T 2200/08* (2013.01); *G06T 2200/24* (2013.01); *G06T 2207/10028* (2013.01); *G06T 2207/20081* (2013.01); *G06T 2210/04* (2013.01)

(58) Field of Classification Search
CPC ......... G06T 15/205; G06T 2207/30184; G06T 2207/10032; G06T 7/593; G06T 7/55; G06T 2210/04; G06T 2219/2004; G06K 9/00208; G06K 9/66
See application file for complete search history.

(56) References Cited

U.S. PATENT DOCUMENTS

| | | |
|---|---|---|
| 9,098,655 B2 | 8/2015 | Plummer et al. |
| 2014/0015929 A1* | 1/2014 | Hong .................... G01B 11/25 348/46 |
| 2014/0192050 A1 | 7/2014 | Qiu et al. |
| 2015/0172628 A1* | 6/2015 | Brown .................... G06T 17/10 348/47 |

OTHER PUBLICATIONS

Wang, H., Zhang, W., Chen, Y., Chen, M., and Yan, K., "Semantic Decomposition and Reconstruction of Compound Buildings with Symmetric Roofs from LiDAR Data and Aerial Imagery". Remote Sens.(2015)7, DOI: 10.3990/rs7103945. 13945-13974.

\* cited by examiner

METHODS AND SYSTEMS FOR WIREFRAMES OF A STRUCTURE OR ELEMENT OF INTEREST AND WIREFRAMES GENERATED THEREFROM

CROSS REFERENCE TO RELATED APPLICATIONS

This application claims priority to U.S. Provisional Application No. 62/377,819, filed Aug. 22, 2016. This application is incorporated herein in its entirety by this reference.

FIELD OF THE INVENTION

The inventions herein relate generally to improvements in wireframe generation and/or verification. Wireframes provided from the inventive systems and methods are verified representations of the structure or element of interest. Such verified wireframes can be used to derive measurements, construction estimates, and other useful outputs therefrom.

BACKGROUND

Accurate measurements of structures, such as all or part of a building and associated areas, are relevant for the construction, remodeling, roofing, building envelope modeling, landscaping, insurance, Virtual Reality/Augmented Reality, and gaming industries. For example, such information is often used by professionals to create quotes, support field planning, make design decisions, measure inspected items, and specify materials and the costs for both new building constructions, as well as for remodeling or repair of existing structures. Landscape designers likewise require accurate measurements. In the insurance industry, accurate information about costs is critical to determining the appropriate premiums for insuring buildings/structures, as well as the reimbursements due to a policyholder resulting from a claim.

As a specific, but non-limiting example, the construction and insurance industries require accurate measurements of various parameters related to roof structures, such as roof dimensions, pitches, penetrations, conditions, obstructions, surfaces, areas, vertex type (e.g., roof corner, vent count, etc.), edge types, surface types (e.g., grey asphalt), and associated material costs. Traditionally, measurements of structures, such as a building roof, have been done by hand. In order to obtain accurate measurements of a building, a worker would be required to visit the building site to take and record roof measurements by hand. To ensure accuracy, the worker would be required to climb onto the roof to obtain measurements, thus leading to potential injuries. Complex roof configurations would result in less accuracy and/or more danger to the worker. In some cases, it is not even feasible to climb a ladder and measure on the roof due to high pitch (>10/12) or when a roof contains damaged and unstable sections. Lastly, in many roofing situations, time can be of the essence: a damaged roof must be replaced quickly to reduce or prevent damage to the interior of the building and its contents. This means that the contractor that can return a roofing quote estimate the quickest might expect to be hired for the job, whereas those submitting bids later will lose the opportunity to gain the revenue.

Obtaining highly accurate measurements using manual techniques such as tape measurement devices is very difficult to achieve on large structures such as roofs, buildings, facades, roads, etc. When survey or field crews go out to capture the measurements on a building, typically, the field sketch will be documented on paper. Validating the accuracy of such measurements is even more challenging because there is no verifiable relationship of the field sketch back to the original structure, unless photos were taken at each endpoint of each measurement. This means that if a different measuring crew or even the same crew re-measures the structure, there is a very high probability that the two sets of measurements will be different. Unambiguously establishing relevant endpoints in a repeatable manner could enable comparison to confirm accuracy, possibly with a high precision measurement device, such as a laser scanner. Another way to indicate the endpoints is to physically mark each measurement endpoint on the structure. However, there is no way in either case to confirm that the measurements were actually taken from those endpoints on the physical structure. In short, such manual in-field measurements do not provide high confidence in the results because typically the user cannot verify the accuracy of the provided measurements. This means that any field measurement errors cannot be verified correctly (i.e., with high precision) after they are taken, so it is very common for these errors to translate through inflated quotes and material cost, resulting in waste and reduced profit margin for the project.

Given at least the concerns of accuracy, time, and costs issues, much effort has been directed toward improving the generation of measurements and the related cost and labor estimates of roofs. To this end, various methods have been proposed to generate roofing measurements without requiring a worker to visit the job site to perform measurements but, rather, to provide measurements from remote locations. Several manual methods have been proposed for this endeavor using aerial images of a roof from which measurements can be derived, as set out, for example, in the background section of US Patent Application Publication No. 20110187713, the disclosure of which is incorporated herein in its entirety by this reference. Such methods are time consuming, require highly trained personnel and/or do not provide highly accurate results. To reduce the time and effort needed to generate wireframes and related output direct from aerial images, the '713 Publication proposes a semi-automated processing methodology. U.S. Pat. No. 9,501,700, the disclosure of which is incorporated in its entirety by this reference, purports to provide a fully automated method of processing aerial images to generate roof models or roofing estimates. However, neither of these automated methods has obtained widespread use as of today because, quite simply, accurate results cannot be assured. Again, the confidence in the output of such methods is not high.

In contrast to the direct output from aerial image methodologies set out in the '713 Publication and the '700 patent, point cloud information can be used to generate roof measurements having improved characteristics. Such improvements are due, at least in part, to the point clouds being more likely to comprise useable 3D information, as compared to the direct-from-image methods from which 3D information need to be extracted from two or more images after establishing correspondences among similar points in images. However, current methodologies do not readily allow point clouds that comprise structural information to be processed automatically to generate accurate wireframes that can be used as output suitable for roof models, measurements, estimates etc. As a result, such point cloud information must undergo substantial manual processing effort to produce a suitable wireframe that can provide useful outputs such as measurements, estimates, etc. This is generally accomplished by importing a point cloud into a 3D CAD tool (for example, AutoCAD®, Revit®, etc.) followed by time consuming manual manipulation of the wireframe to generate a suitably accurate wireframe. Often, visually finding 3D points to build a wireframe on a point cloud while zoomed in is challenging due to loss of perspective for the overall structure. Moreover, even with such extensive manual manipulation, accuracy of output, for example measurements and/or geometric information, that are derivable from such point clouds cannot be guaranteed. In short, existing methods of processing point clouds to generate wireframes and related output do not provide high user confidence in the output.

Notably, any errors in the original wireframe output will be propagated throughout direct and indirect use of the output. For example, if a measurement derived from the output deviates from the actual measurement, any construction estimate generated from that measurement will also deviate from the actual requirement. Overestimation of materials and labor due to uncertainties in measurement confidence is a common process to ensure enough material is on site to complete the job and avoid delays in shipping of new material. Further, if the deviation is in regard to a roof pitch, the measurement mismatch, and any associated downsides, between the actual roof measurement and the roof measurement generated from an automated or manual output will be exacerbated.

Put another way, existing methods of generating wireframes and associated output from structures or elements of interest, such as roofs, are time consuming and known to typically generate inaccurate results, whether they be in the form of models, measurements, geometric information, construction estimates, reports, manual sketches etc. Such known inaccuracy results in a lack of user confidence in the results, and attendant compensation, such as by an additional validation or re-measurement step and/or increased labor and material costs, are needed to counter negative outcomes related thereto.

In addition to being able to generate wireframes from which accurate measurements can be derived, current methods of generating wireframes do not provide users with any degree of confidence that the wireframe and any associated output therefrom are accurate representations of the structure or element of interest. In short, users of wireframes are required to trust that the wireframe and any associated output are, in fact, what they purport to be. Given the stakes involved in such reliance, users will typically make educated guesses at how incorrect the wireframes and associated outputs are, thus resulting in downsides such as ordering extra supplies "just in case."

Moreover, in some cases, a wireframe and associated output that are only marginally accurate, may be "good enough" for some purposes. Users nonetheless are not provided with any knowledge of how correct or incorrect the wireframe and associated output might be in a particular situation. In other words, inaccurate wireframes are indistinguishable from accurate wireframes as outputs from the vantage point of the users. Verification that a wireframe is "good enough" can be relevant in some user contexts, but there is no current methodology that provides the information needed to generate such user confidence in the nature and quality of a generated wireframe and associated output therefrom.

There remains a need for reducing and/or streamlining the amount of effort currently required to generate accurate wireframes of structures or elements of interest. Still further, there is a need for improvements in the ability to generate user confidence in the information derivable from such wireframes and output generated therefrom. The present disclosure provides these and other benefits.

SUMMARY

Aspects of the present disclosure are related to systems and processes for generating verified wireframes. In one aspect, among others, a method of generating a verified wireframe of a structure or element of interest comprises generating, by a computer or a user, an unverified wireframe corresponding to at least part of a structure or element of interest comprising one or more structural aspects of interest, wherein the unverified wireframe: is derived from a plurality of overlapping 2D images of the structure or element of interest, wherein the 2D images are generated from a passive image capture device, and incorporates one or more of the structural aspects; and comprises one or more features that correspond to the one or more structural aspects; and projecting the unverified wireframe over either or both of: one or more 2D images selected from the plurality of overlapping 2D images, wherein each of the selected 2D images incorporates at least some of the one or more structural aspects; or a point cloud derived from the plurality of overlapping 2D images, wherein the point cloud incorporates at least some of the one or more structural aspects; and adjusting, by either or both of the computer or user, at least part of the unverified wireframe, wherein the adjusting is by alignment of at least one of the one or more unverified wireframe features with a corresponding structural aspect visible in each of the one or more selected 2D images or the point cloud over which the unverified wireframe is projected, or indicating, by either or both of the computer or user, acceptance of the unverified wireframe without adjustment, thereby generating a verified wireframe comprising all or part of the structure or element of interest.

In one or more aspects, the structure or element of interest can comprise all or part of a roof, and the one or more structural aspects of interest comprises a roof area, a roof corner, a roof pitch, a roof edge, a roof gutter, a roof gable, a dormer, or a skylight. At least part of the adjusting can be conducted by a user and a plurality of 2D images are selected for presentation to the user, wherein each of the plurality of 2D images are selected by the user or the computer to present a different view of the one or more structural aspects of interest to the user. When the user aligns at least one unverified wireframe feature with a corresponding structural aspect of interest on a presented 2D image, modifications to the wireframe resulting from the alignment can be visible to the user on at least one other 2D image in the plurality of presented 2D images. Measurement information can be derived from the verified wireframe, and wherein the measurement information can be less than 5% different from an actual measurement value for the corresponding structural aspect, or can be less than 1% different from an actual measurement value for the corresponding structural aspect. In various aspects, the adjusting step can be associated with one or more rules associated with the one or more structural aspects of interest; and each of the one or more rules can define an allowed positioning for the one or more structural aspects, a prohibited positioning for the one or more structural aspects, or both an allowed and a prohibited positioning for the one or more structural aspects. When a user generated adjustment conforms to an allowed positioning for the structural aspect the adjustment can be maintained by the computer; or when the user generated adjustment conforms to a prohibited positioning for the structural aspect the adjustment can be rejected by the computer. The wireframe verification process can be generated by a user, and during the projection and adjustment steps either or both of visual or audible instructions can be provided to the user by the computer. Information about one or more of the projection or the adjustment of the unverified wireframe can be collected by the computer for incorporation into a machine learning process.

In another aspect, a system comprises at least one computing device comprising a processor; and a wireframe verification application stored in memory, where execution of the wireframe verification application by the processor causes the at least one computing device to: generate an unverified wireframe corresponding to at least part of a structure or element of interest comprising one or more structural aspects of interest, wherein the unverified wireframe: is derived from a plurality of overlapping 2D images of the structure or element of interest, wherein the 2D images are generated from a passive image capture device, and incorporates one or more of the structural aspects; and comprises one or more features that correspond to the one or more structural aspects; and project the unverified wireframe over either or both of: one or more 2D images selected from the plurality of overlapping 2D images, wherein each of the selected 2D images incorporates at least some of the one or more structural aspects; or a point cloud derived from the plurality of overlapping 2D images, wherein the point cloud incorporates at least some of the one or more structural aspects; and adjust at least part of the unverified wireframe, wherein the adjusting is by alignment of at least one of the one or more unverified wireframe features with a corresponding structural aspect visible in each of the one or more selected 2D images or the point cloud over which the unverified wireframe is projected, or indicate acceptance of the unverified wireframe without adjustment, thereby generating a verified wireframe comprising all or part of the structure or element of interest. The unverified wireframe can be generated based upon user input.

In one or more aspects, at least part of the adjusting cam be conducted based upon a user input and a plurality of 2D images are selected for presentation to the user, wherein each of the plurality of 2D images are selected by the user or the computer to present a different view of the one or more structural aspects of interest to the user. When the user aligns at least one unverified wireframe feature with a corresponding structural aspect of interest on a presented 2D image, modifications to the wireframe resulting from the alignment can be visible to the user on at least one other 2D image in the plurality of presented 2D images. Measurement information can be derived from the verified wireframe, and wherein the measurement information can be less than 5% different from an actual measurement value for the corresponding structural aspect, or can be less than 1% different from an actual measurement value for the corresponding structural aspect. In various aspects, the adjusting step can be associated with one or more rules associated with the one or more structural aspects of interest; and each of the one or more rules can define an allowed positioning for the one or more structural aspects, a prohibited positioning for the one or more structural aspects, or both an allowed and a prohibited positioning for the one or more structural aspects. When a user generated adjustment conforms to an allowed positioning for the structural aspect the adjustment can be maintained by the wireframe verification application; or when the user generated adjustment conforms to a prohibited positioning for the structural aspect the adjustment can be rejected by the wireframe verification application. The wireframe verification application can present either or both of visual or audible instructions to the user during the projection and adjustment steps. Information about one or more of the projection or the adjustment of the unverified wireframe can be collected by the wireframe verification application and stored in the memory for incorporation into a machine learning process. The indication of acceptance can be based upon a user input.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION

Figure 1:
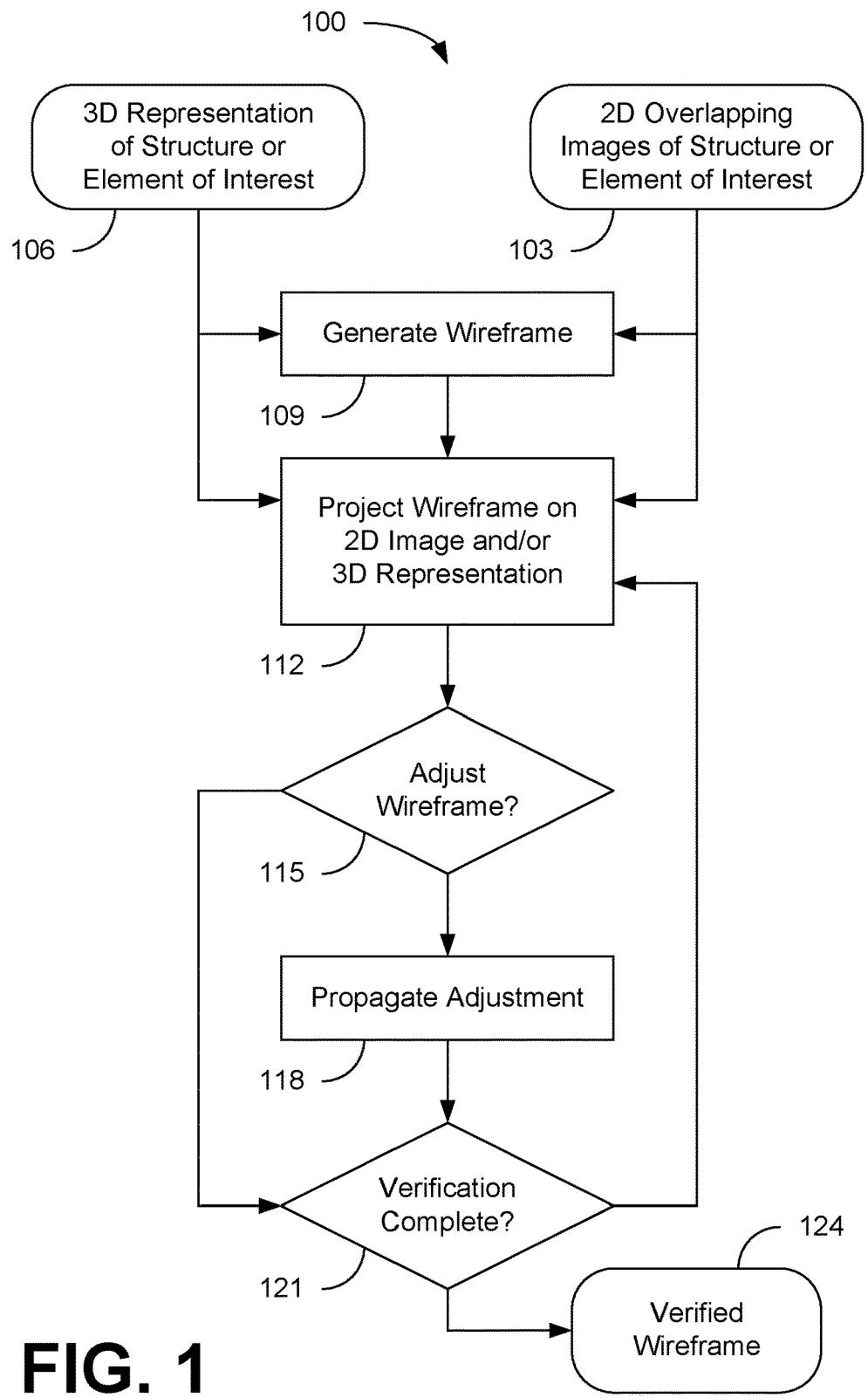
FIG. 1 is a flow diagram illustrating an exemplary implementation of a wireframe verification, in accordance with various aspects of the present disclosure.

Many aspects of the disclosure can be better understood with reference to the Figures presented herewith. The Figures are intended to illustrate the various features of the present disclosure. Moreover, like references in the drawings designate corresponding parts among the several views. While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

"Unverified wireframe" is a wireframe that could be derived from one of the following sources of input data: 1) a set of 2D aerial/terrestrial/satellite/orthographic/mobile/etc. imagery from the structure or element of interest; 2) a 3D representation of the structure or element of interest, where the 3D representation is derived from point cloud information or surface mesh or computer aided design (CAD) model or building information modeling (BIM) model incorporating the structure or element of interest; or 3) combination of the two previously mentioned sources. The unverified wireframe can be generated by a computer or a user, as set out in more detail herein. If the unverified wireframe is generated by a computer, such generation can occur automatically. When generated by a user, the user can generate a wireframe by extraction of the edges, vertices, etc., such as by drawing these elements and others to create a viewable line drawing corresponding to a viewable 2D or 3D image of the structure or element of interest. The unverified wireframe comprises one or more features or element that correspond to one or more structural aspects of a structure or elements of interest.

"Unverified wireframes" also include wireframes that comprise modifications of the original unverified wireframe, but for which the verification process has not yet been completed. Adjustment to the original unverified wireframe can be made by comparison of one or more features on the unverified wireframe with at least one 2D image of the structure or element of interest or at least one point cloud incorporating a corresponding feature on the structure or element of interest or the combination of the two. The adjustment processes produce a modified but as yet unverified wireframe that can be further adjusted during the wireframe verification process. All or part of such verification can be made by visual comparison by a user of the unverified wireframe with a portion or portions of one or more 2D images or point cloud of the structure or element of interest. Adjustments to the unverified wireframe resulting from a determination that one or more features of the unverified wireframe is substantially not in alignment with at least one corresponding feature in the image(s) or point cloud can be made manually by a user or by the computer via machine instructions as set out further herein, or a combination of both user action and computer action.

A "verified wireframe" is the output of the wireframe verification process. Such verified wireframe can be a modified version of the original unverified wireframe, where such modification(s) incorporates one or more adjustments made to the unverified wireframe in the wireframe verification process. The verified wireframe can also be an exact copy of the original unverified wireframe if it is determined in the verification process by the user or the computer that the original unverified wireframe needed no adjustment, either because the accuracy was desired and the unverified wireframe was deemed to be accurate as generated, or the generated wireframe was deemed to be "good enough" for the intended use such that no adjustment was needed.

Adjustment to the unverified wireframe can be made by comparison of one or more features on the unverified wireframe with at least one 2D image of the structure or element of interest or at least one point cloud incorporating a corresponding feature on the structure or element of interest or the combination of the two. All or part of such verification can be made by visual comparison by a user of the unverified wireframe with a portion or portions of one or more 2D images or point cloud of the structure or element of interest. Adjustments to the unverified wireframe resulting from a determination that one or more features of unverified wireframe is substantially not in alignment with at least one corresponding feature can be made manually by a user or by the computer via machine instructions as set out further herein, or a combination of both user action and computer action. The verified wireframe can also be an exact copy of the unverified wireframe if it is determined in the verification process by the user or the computer that the unverified wireframe needed no adjustment. An unverified wireframe becomes a "verified wireframe" after going through the inventive verification process herein even though no adjustment is made thereto.

An "accurate verified wireframe" is a specific type of verified wireframe that includes measurement and geometric information that is substantially identical to that of the actual measurements and geometry of the structure or element of interest that is being modeled in the wireframe generation process. In other aspects, the verified wireframe is a substantially accurate model of the structural aspects of interest present in the structure or element of interest.

In some implementations, the verified wireframe need not be an accurate wireframe, as such accuracy is defined elsewhere herein. As one example, a "low quality" wireframe—that is, one that may not substantially conform to the dimensions of the structure or element of interest—can be verified by the user to be low quality. While such a low quality wireframe may be suitable for some uses, user verification allows the user to understand that the subject wireframe is likely not suitable for extracting accurate measurement information etc. therefrom. For example, the verification can allow the user to have confidence that adding additional materials to his supply order is appropriate given the lack of accuracy known to be present in the measurement information etc. derived from the wireframe as a result of verification thereof. Verification of the wireframe as low quality can alternatively provide the user with confidence that the wireframe generation process must be redone, such as by acquiring new point clouds of the structure or element of interest. Such new point clouds can be acquired by generating new images, point clouds etc. of the structure or element of interest, or by processing a different set of images, point clouds etc. to generate a further wireframe for verification.

A "structure or element of interest" can encompass a wide variety of structures or elements that may be present in a scene such as, for example, components of a building (e.g., doors, windows, trim, shutters, walls, roof, roof edges, gutters, stairs, plumbing/piping, electrical equipment, flooring material, decorative aspects), skylights, air conditioning units, landscape components (e.g., trees, shrubs, driveways, water features), vehicles, people, animals and the like. Indeed, a "structure or element of interest" can be anything from which information suitable for processing to provide information about such structure or element(s) can be derived from a scene. Further, the methodology herein can be utilized to extract information about more than one structure or element of interest in a scene, such as a collection of smaller structure or elements (e.g., doors, windows, etc.) associated with a larger structure or element (e.g., the overall dimensions of a building) where information about such collection of smaller and larger structure or elements can be processed and, in some aspects, the one or more structure or elements can be identified from the scene.

As used herein, the phrases "one or more structure or elements," "structure or element of interest," "structure or element(s) of interest" and "structure or elements" can be used interchangeably, and it is to be understood that, in some instances, one structure or element of interest may be present or partially present in a scene, and in others, there may be more than one structure or element of interest in the scene. "Partially" ("or at least part of") in reference to the one or more structure or elements of interest refers to an instance where only a portion or portions but not the whole of a structure or element is visible in the scene. In some aspects, the present methodology can be utilized to generate information about single or multiple structures or elements of interest that may be present or partially present in a scene, as desired by a user. An example of partial presence of a structure or element in a scene can include instances where the structure or element is only partially captured due to occlusion or the perspective of the capture device or where parts of the structure or element fit into the scene but the entirety of the structure or element does not.

In some aspects, the present invention provides methods to verify and adjust, if necessary, an unverified wireframe that is derived from a point cloud, where the point cloud is generated according to methodology as set out hereinafter. In contrast to previous methods of verifying and manually adjusting wireframes to accurately model the structure or element of interest, the inventive methods and systems allow a user to greatly reduce the amount of time needed to complete the verification and any associated adjustment tasks. In this regard, the inventors herein have determined that visualization by projection or overlay of the unverified wireframe on or over a point cloud derived from the structure or element of interest and/or on or over at least one 2D image representation or a 3D representation (e.g., derived from the point cloud information) of the structure or element of interest results in a verified wireframe. Such verified wireframe provides the benefit of providing user confidence in the accuracy (or lack thereof) of the wireframe that is so verified, and any output associated therefrom.

As set forth in more detail herein, such user confidence can result from projecting or overlaying the unverified wireframe on one or more 2D image representations and/or a 3D representation of the structure or element of interest, and facilitating navigation by the user through and around the unverified wireframe during a verification process. Such navigation can include zooming and panning to provide multiple angles for the unverified wireframe to allow the user to inspect the unverified wireframe vertices, whereby the positioning of such vertices can be adjusted against the 2D image representation(s) and/or 3D representation. By verifying that at least the vertices of the unverified wireframe are or are not accurately matched or aligned with the corresponding vertices on the 2D image and/or 3D representations, a verified wireframe having user confidence in the output therefrom can be generated. User confidence can also result from knowledge that a fully or partially automated or manual wireframe verification and adjustment process has been conducted according to a defined process configured to ensure that the verified wireframe is or is not an accurate model of all or part of the structure or element of interest.

User confidence is the ability to trust or rely upon the information provided by the verified wireframe based upon desired criteria of the user, without the need for further verification. For example, the user can be confident that the wireframe endpoints are accurate to within the resolution provided by the one or more 2D image representations and/or 3D representation, and thus measurements based upon the endpoints would be similarly accurate. This resolution can be affected by, e.g., pixel density, distance, image angle, focus, etc. of the one or more 2D images provided for verification. Yet further, the user can be confident that the wireframes and any associated outputs are not accurate in relation to one or more aspects of the structure or element of interest. Knowledge of whether the wireframe is or is not accurate can have utility as discussed elsewhere herein.

The unverified wireframe that is verified and adjusted, if appropriate, in accordance with the present invention can be derived from a point cloud, where the point clouds incorporate all or part of a structure or element of interest. The point cloud will comprise one or more structural features of interest present in the structure or element of interest.

As used herein, a "point cloud" is a set of data points in the same coordinate system. In a three-dimensional coordinate system, these points are usually defined by X, Y, and Z coordinates. There are a variety of methodologies to that can be used to generate wireframes from point clouds, and such are not part of the invention herein.

A plurality of 2D images can be captured and used to generate and/or verify a wireframe of the structure or element of interest. In some implementations, these 2D images can be separated into different groups which can be independently used to generate the unverified wireframe and to validate that unverified wireframe after it has been generated. In other aspects, some or all of the 2D images can be used to both generate and validate the unverified wireframe. Accordingly, at least part of the verification methodology comprises providing a first plurality of 2D images from which a unverified wireframe is derived via a point cloud generated therefrom and selecting a second plurality of 2D images therefrom and/or designating separate 2D images for use in the visual verification process. When one or more 2D images are used in the verification process of a wireframe that is generated from a set of 2D images, the 2D image frame on which the wireframe is projected or overlaid comprises at least a portion of the structure or element of interest from which the unverified wireframe is generated. In some embodiments, only some of the 2D images that were used to generate the unverified wireframe and the associated point cloud may be used for verification and adjustment of the unverified wireframe. The selection of the number and content of the 2D images can be made by the user or the computer or both.

In some implementations, the 2D images used for verification need not be a part of the image set used for generating the unverified wireframe. In this regard, the 2D images used in the verification step could be derived from a set of images that were independently generated, that is, produced separately from, the 2D images from which the unverified wireframe was derived. Information that registers the set of 2D images used for verification to the unverified wireframe will be associated therewith, as discussed further hereinafter.

In some aspects, the verification processes herein can incorporate some or all of the following elements: a plurality of 2D images for generation of a point cloud; a point cloud (sometimes in a displayable format) generated from such images; information regarding intrinsic and extrinsic camera parameters corresponding to each image, and/or other information that describe the relationships between the images.

The inventive processes and wireframes generated therefrom can be contrasted to alternative approaches to manually creating a wireframe from a point cloud using a CAD tool, in which a user manually selects points in the point cloud and identifies the subject points as vertices of a wireframe. In this regard, the inventive systems and verified wireframes are substantially not generated using a CAD tool and the verified wireframe and any associated downstream use thereof are not derived from a CAD tool. The inventive wireframe generation process is streamlined and made faster because the user can select a vertex across one or more 2D images and/or a 3D representation of the structure or element of interest rather than relying solely on the 3D point cloud for direct generation of the wireframe. Still further, the inventive processes and wireframes consist essentially of processes that incorporate projecting or overlaying of the unverified wireframe generated from a point cloud of the structure or element of interest on one or more 2D images or a point cloud of the structure or element of interest. When a wireframe intended for use in one or more downstream processes is generated in this manner, a verified wireframe is generated.

Suitable point clouds from which the unverified wireframe can be generated, or on which such first generated wireframe can be projected or overlaid, can be generated from a plurality of 2D images generated from a single passive image capture device. In this regard, point clouds suitable for processing according to the methods of the present disclosure can be generated according to the methods disclosed in the U.S. Pat. No. 9,460,517, the disclosure of which is incorporated herein in its entirety by this reference. In particular, a point cloud from which the unverified wireframe is derived and that can be used to generate a point cloud for the visual verification can be generated from a plurality of 2D images generated from a single passive image capture device. Yet further, the point cloud consists essentially of a plurality of 2D images generated from a passive image capture device. Yet further, the 2D digital images from which the point cloud(s) are derived can be generated by an image-capture device that consists essentially of a passive sensing technique. In some exemplary aspects, the inventive method herein can utilize a technique that processes a plurality of stationary or video images to provide dense point cloud-based 3D reconstructions of structures or elements comprising planar surfaces, such as roofs, followed by extraction of all vertices and/or edges of the included planes and creation of vertices on the generated wireframe.

The image-capture devices from which the 2D images are generated can be integrated into a device such as a smartphone, tablet or wearable device or the image-capture devices can be as stand-alone camera device. The image-capture device can also be incorporated in a specialized measurement device.

An exemplary method that can be used to generate point clouds using the passive image capture photogrammetry method of the '517 patent comprises receiving a plurality of 2D digital images of the scene, where all or part of at least one structure or element of interest is present in a scene. The structure or element of interest can be selected from the scene by a user or by a computer. The 2D digital images will at least partially overlap with regard to the relevant structural features of the selected structure or element of interest. In order to generate a point cloud for all or part of the structure or element of interest, at least some of the 2D digital overlapping images of the object are processed using methodology that incorporates a structure from motion algorithm.

Point clouds derived from stereographic image capture methodologies can also suitably be used herein. One type of stereographic imaging that can be utilized to generate suitable point clouds for use herein are disclosed in U.S. Pat. No. 8,897,539, the disclosure of which is hereby incorporated by reference in its entirety.

Point clouds derived from structured light imaging devices e.g., the first version of Microsoft Kinect®, Matterport®, Tango®, etc. can also be used. As would be understood, such devices combine RGB imaging with depth detection otherwise known as RGBD images. Such images can be processed to generate point clouds using known methods, such as utilizing MATLAB, or open source software libraries, such as the "Point Cloud Library." Yet further, Tango-derived images incorporate information derived from motion tracking with integration of accelerometer and gyroscope data to generate detailed information about the movement of the image capture device in space, as well as depth information about one or more objects of interest in a scene. Software configured for use with Tango-derived images can be used to generate point clouds therefrom. Other forms of structured light instruments and methods can be used to suitably generate point clouds for use herein.

Point clouds generated from time of flight imaging devices are also suitable for use herein. As would be recognized, a time of flight imaging device computes the distance or depth value based on the known speed of light and based on measuring the time of flight of a light signal between the camera and the reflecting object, for each point of the resulting image. In a time of flight imaging device, the entire scene is captured with each laser or light pulse. The current version of Microsoft Kinect® is a time of flight imaging device.

Yet further, point clouds generated from ground-based or mobile or airborne or time-of-flight or phase-based LIDAR or other appropriate laser scanner can be used herein. Laser scanning can utilize movable mirrors to redirect a laser beam to obtain measurement information one or more dimensions. One suitable method for generating point clouds from LIDAR is disclosed in US Patent Publication No. US 2009/0232388, the disclosure of which is hereby incorporated by reference in its entirety.

Point clouds suitable for use herein can also be generated from GPS information coupled with provided 2D images. For example, when a number of aerial images having suitable overlap are taken from multiple view angles generated in conjunction with GPS information, a dense point cloud of one or more objects present in a scene wherein the object(s) are geo-referenced can be generated. The aerial images can be obtained using manned or unmanned aerial vehicles such as, e.g., aircraft, drones, satellites, etc.

In the case of using 2D images along with a 3D representation of a structure or element of interest to obtain a verified wireframe, in some implementations, it is not necessary for the image set to be involved in the creation of the 3D representation of the structure or element of interest or even the unverified wireframe. For example, the unverified wireframe could be generated from a set of drone-captured imagery but verified using a set of aerial imagery or the combination of aerial and drone-captured imagery. Another example would be to mix a set of aerial and ground-based (mobile) imagery for that purpose. Yet, another example could be using terrestrial laser scanning to generate a 3D representation of the structure or element of interest but verify the unverified wireframe using a set of 2D imagery captured via a mobile imaging device such a DSLR camera. This could be even extended to using an as-built BIM model to verify the unverified wireframe. The only criterion for this functionality is to register the 3D representation, unverified wireframe, and imagery in the same coordinate system. This can be as simple as having the 3D representation, unverified wireframe, and different sets of imagery in a global coordinate system such as Geodetic or Geocentric coordinate system or different but known local coordinate systems. A more complex scenario happens when the 3D representation, unverified wireframe, and different sets of imagery are in different unknown coordinate systems. In this scenario, a set of 2D and/or 3D features could be extracted and matched automatically among the different datasets or provided by a user. Corresponding 2D features can be converted into 3D features using visual triangulation techniques. Having at least three corresponding 3D features between two unknown coordinate systems allows computing a transform matrix that maps the two coordinate systems. Such a transform matrix or a set of transform matrices could be used to bring the 3D representation, unverified wireframe, and different sets of 2D imagery into a known coordinate system.

Yet further, the present invention enables automatic adjustment/verification of the unverified wireframe based on new 2D and/or 3D data that might become available in a later time. For example, a unverified wireframe for a building could be generated from a set of aerial imagery that has been captured in the last winter. Because of a recent flight, a set of new aerial imagery with higher resolution or less-occluded viewpoints might now become available. The present invention could use this new dataset to automatically enhance the user confidence and quality of the unverified wireframe to the highest feasible accuracy level that can be achieved from the new imagery.

The present invention allows a user to obtain verified wireframes of all or part of a structure or element of interest by enabling quick and accurate verification that the plurality of vertices and/or edges on the unverified wireframe match those same vertices and/or edges as appearing on a plurality of 2D images or are in alignment with 3D representation from which the unverified wireframe was derived. In other words, elements of the unverified wireframe that correspond to structural aspects of interest on the structure or element of interest are alignable, and are aligned to generate a verified wireframe. The user can also quickly adjust the unverified wireframe as necessary so as to allow verified wireframe to be generated. As would be recognized, verification of the correct placement of the vertices and/or edges on the wireframe will translate into a verified wireframe that more accurately corresponds to the actual dimensions, geometry, and measurements of the structure or element of interest, for example a roof.

The verified wireframes can be used to provide useful information. In this regard, the outputs of the verification processes herein, that is, the measurements, dimensions, geometry, etc. for the structure or element of interest have applications in a number of useful areas, including, but not limited to: inventorying, asset management, construction, merchandising, insurance underwriting and claims adjustment, civil engineering, architecture and design, building information modeling (BIM), home remodeling, roofing, flooring, real estate listing, gaming, mixed reality, virtual reality, augmented reality, among other things.

Moreover, the inventive process allows collection and analysis of useful information generated during the verification and adjustment (if any) processes themselves or in user training, thereby enabling improvements to be made in subsequent visual verification and adjustment tasks. The feedback given to a user by the computer during the user's verification of the wireframe and any adjustments made thereto, can be useful to train the user. In this regard, the wireframe verification processes of the present invention also can be useful improve the operation and associated output of the user for subsequent wireframe verification processes. In some aspects, the wireframe verification process will incorporate information about a level of experience of the subject user, where such information can further be utilized to develop user confidence. For example, a user with significant experience in verifying wireframes likely is more skilled at the task. Thus, it follows that a more confidence will exist in his wireframe verification than with a user who has less experience. The feedback associated with the verification and adjustment processes can be incorporated into or associated with a user training module.

Any user interaction during the adjustment processes can be recorded and later fed into a machine learning system to devise a computer model that can simulate/predict user behavior in verifying a wireframe. This could include objective and/or subjective logics for removing/adding vertices, removing/adding edges, projecting vertices onto a specific surface such as a planar surface, adjusting 2D/3D location of a vertex or edge, merging/splitting edges, merging/splitting surfaces, expanding/shrinking edges, expanding/shrinking surfaces, intersecting edges or surfaces, estimating the geometry of the wireframe in occluded areas, labeling different edge types, labeling different surface types, etc. Such useful information can be used to train subsequent processes, to further streamline and improve future verification processes. Such training can be used for manual adjustment and/or those operated or assisted by machine learning techniques, for example. Such verification processes result in a verified wireframe having user confidence.

In some aspects, the visual verification and adjustment methods and systems herein can be used to create a verified wireframe that is substantially more accurate than the unverified wireframe, where accuracy is in relation to the actual dimensions (e.g., measurements and/or geometry), when such actual dimensions are generated from physical measurement of the corresponding locations on the structure or element of interest. In this regard, once the inventive verification process is substantially completed, verified wireframes obtained according to the inventive methodology will be substantially accurate because they allow measurements or geometry or other dimensional information to be derived therefrom that have less than about 10% or about 5% or less than about 2% or less than about 1% or less than about 0.5% deviation those of the actual (e.g., "real life") element or structure of interest. For example, if a roof section on a house has a length of 50 feet, the verified wireframe section corresponding to that roof length will be generated as ranging in length of from about 45 to about 55 feet, or from about 47.5 to about 52.5 or from about 49 to about 51 feet or from about 49.5 to about 50.5 feet. In some applications, even greater accuracy than about 1% error can be obtained, such as within about 1 inch or within about 0.5 inches or within about 0.25 inches of the actual measurement value of the element or structure of interest. Yet further, less than 1% or less than 0.1% error in the resulting measurement or geometric information may be obtainable.

The described inventive process can be auto-directed using a workflow process in that a user can be prompted to verify the accuracy of (or to adjust) the unverified wireframe in relation to the one or more 2D images or a point cloud from which the unverified wireframe was derived. The user can have the ability to observe the quality of alignment of the unverified wireframe with the one or more 2D images and/or the point cloud in real time so as to allow confirm the correctness of modifications thereto while the visual verification and adjustment processes are underway. During the adjustment process, the unverified wireframe is undergoing alignment with the one or more 2D images or point cloud and is undergoing adjustment.

While the amount of time necessary to visually verify and adjust (if necessary) a unverified wireframe using the inventive methodology will vary among users, generally, the method herein can allow verification of an entire average roof wireframe (e.g., typical residential building) in less than about 10 minutes or in less than about 5 minutes or even less than about 2 minutes, where an entire roof wireframe comprises a plurality of individual wireframes that can be collected to provide the entire roof wireframes. When applied to verification of wireframes generated from roofs, the user will spend roughly less than about 5 seconds or about 10 seconds or about 20 seconds or about 30 seconds verifying each vertex of the roof. Notably, current methodologies of verifying and adjusting an average roof wireframe to make it accurate takes users considerably longer time than with the inventive methods. Moreover, the subjectivity inherent in human-processed wireframe methodologies does not facilitate the generation of accurate wireframes, even when a user expends considerable time on verification. In short, the methodology herein enables not only faster verification of wireframes derived from point clouds, but also results in more accurate wireframe generation (if that is a desired output), where accuracy is in relation to the dimensions of the corresponding structural features of the element or structure that are represented by the wireframe. In other words, a partially or fully computer directed workflow process, such as provided by the present invention, improves the accuracy of the output wireframe. Moreover, when the user can observe the verification process and, indeed, is provided with the guidance to achieve such verification as well as confirmation thereof, the user confidence is generated in the accuracy of the verified wireframes. Alternatively, the verification can provide user confidence that the verified wireframe and any associated output is "good enough," if that is the desired result.

For example, the present invention further allows an unverified wireframe that is derived from a poor quality point cloud or from another source to be user-modified to improve its accuracy, as well as to provide a verified wireframe and associated user confidence therefrom. For example, when the unverified wireframe is generated by a user by drawing one or more parts of the structure or element of interest to be visible on the user's screen, that drawn unverified wireframe will likely be of a low quality, that is, will be less accurate, such as in relation to measurements, geometry or the like. In some aspects, the methodology herein can enable a poor quality unverified wireframe, such as the drawn unverified wireframe, to be quickly and easily corrected to convert it into a verified wireframe that is substantially accurate or otherwise suitable for the desired use, that is, a wireframe that can be used output for use in CAD systems or the like, so that output therefrom can be used to generate accurate measurements, reports, estimates etc.

The verification process can also be useful when the unverified wireframe is generated from a low texture scene, such as when the lack of features may not allow generation of a point cloud having suitable density and therefore fails to allow an accurate wireframe to be generated therefrom. In this regard, during the verification and any associated adjustment of the unverified wireframe comprising a structural feature of a structure or element of interest, the user can be directed or the user can direct himself, such as by user selection, to add additional vertices and/or to correct vertices and/or edges in relation to the one or more 2D images of the structure or element of interest or in relation to the point cloud of the structure or element of interest. In this way, the lack of coverage or overlap in sparse or empty regions of the point cloud can be compensated for in the wireframe. In some cases, the geometry of a more complete region of the point cloud (e.g., parameters of a plane) can be used to augment or fill in missing sections of the wireframe. Such verified wireframe (that is, the wireframe that has been verified, augmented and adjusted if necessary) will comprise dimensions that substantially match the dimensions of the structure or element of interest such that the wireframe can be used as an accurate model of all or part of the structure or element of interest.

In a first element of application of the process of verification and accuracy determination of a unverified wireframe, the user can be visually presented on a display (e.g., a computer terminal) or suitable interactive screen (e.g., a touch screen of a computing device) with a 2D view of one of a plurality of images from which the wireframe was derived or images that separately designated for verification, or where the coordinates of the images are registered with the wireframe. Yet further, a 3D view, such as by way of a point cloud from which the wireframe was derived can be overlaid with the unverified wireframe. Alternatively, a 3D view, such as by way of a point cloud, upon which the unverified wireframe can also be visually projected or overlaid can be presented simultaneously with a corresponding 2D image view of one or more 2D images. Still further, more than one of the plurality of 2D images can be presented to a user for overlay by the wireframe in sequence, where the multiple images are presented as separate image frames to the user.

While the description hereinafter specifically addresses verification of a unverified wireframe where a roof is the structure or element of interest, it is to be recognized that the systems and methods herein can be used to verify and adjust wireframes of other structures or elements that may be of interest. To this end, wireframes generated from a wide variety of structures or elements can be verified according to the methodology herein. In non-limiting examples, the present invention allows verification of wireframes generated of roofs, skylights and other features on roofs, commercial/industrial building exteriors and interiors, landscape elements, residential building exteriors and interiors, floors, parking lots, roadways, bridges, machinery, or any other suitable structure or element that may be of interest.

The processes and systems herein project the vertices and/or edges of a unverified wireframe onto one or more 2D images and/or a point cloud that incorporate corresponding vertice(s) and/or edges to improve a user's ability to ensure that a wireframe generated therefrom is a suitable representation of the structure or element of interest, that is, the wireframe generated therefrom is "verified." The vertices and/or edges correspond to one or more structural features of interest in a structure or element of interest.

If the user determines that an adjustment of one or more features or aspects of the unverified wireframe is required to generate a desired degree of alignment with the 2D image(s) or the point cloud, that portion of the unverified wireframe needing adjustment is moved by the user's dragging either or both of vertices and/or edges to align those same vertices and/or edges with the subject 2D image(s) or point cloud onto which the unverified wireframe is being projected or overlaid. In some cases, dragging could mean clicking by the user at a new area or point or marked point on the image to choose the new vertex or edge location. Dragging an edge can also result in adjustment of the connected vertex. When a vertex is dragged, the vertex can also be marked on the screen or is otherwise associated with a user notification to ensure that the user also verifies that the corner is correctly configured after the line is moved.

To enhance the ability of a user to verify alignment of the subject vertex and/or edge, auto-zooming functionality can be provided by the software instructions to enable the user to quickly view image detail and make small adjustments to the wireframe. The process is configurable to allow the zoomed images to be moved or adjusted within the user's visual field using zooming and panning functionalities.

Each of the one or more 2D images can be selected from the plurality of images that were used to generate the point cloud from which the unverified wireframe was derived. In other implementations, the 2D images can be from a group that was not used to generate the point cloud, but was designated for independent verification of the unverified wireframe. For example, a subset of the full set of images that are used to derive the unverified wireframe can be used in the visual verification process, a group of images that were not used to generate the unverified wireframe can be used for verification, or a combination of images that were used to generate the unverified wireframe and images that were not used to generate the unverified wireframe can be used for the verification. In this regard, the one or more images selected for visual verification of a vertex can be those providing the largest angle of triangulation or can be those that are spatially closest to the vertex. Such larger angles of triangulation can enhance the ability of a user to visually verify alignment of vertices and/or edges between the unverified wireframe and those in the corresponding 2D image or images. Larger angles could ensure that the images that are most apart from each other or images that show the same part of the structure but taken from significantly different locations are used. The angle of triangulation can be a significant feature because the larger the angle of triangulation, the more confidence that can be generated from the 3D coordinates of the point (the region/volume of uncertainty is smaller). The angles can vary in this regard, but in some aspects, a suitable minimum angle of triangulation can be about 10 degrees or greater.

In further aspects, vertex and edge projections for the wireframe during adjustment are kept substantially synchronized among one or more of the plurality of other presented 2D images as the user makes adjustments to the unverified wireframe in relation to a first presented 2D image. In other words, an adjustment made based on one of the 2D images is also applied to the other 2D images used for verification. This can allow the user to better visualize the impact of an adjustment to a single part of the wireframe as that adjustment propagates through the plurality of 2D images that incorporate different views of the structure or element for which a verified wireframe is desired. For example, if the user adjusts a vertex to align with a single 2D image, such adjustment may create a lack of alignment in another image. Consider a unverified wireframe of a roof having vertices labelled A, B, C, D and E. Those vertices will appear in different perspectives in the underlying 2D images, and the images can be identified as relating to one or more of the labelled vertices. The subset of 2D images that comprise suitable angles of triangulation, as set out hereinabove, can be automatically selected from the larger group of 2D images for presentation to the user for verification and, if appropriate, adjustment. This selected subset beneficially comprises one or more 2D images of the structure or element of interest where the pictured vertex/vertices of the structure or element of interest comprise angles of triangulation for the vertex/vertices that are suitably large enough to allow for determination of whether a corresponding vertex and/or edge of the unverified wireframe is accurate with regard to the dimensions of the actual roof. An image that contains more than one vertex—for example, vertices A and B—may present one vertex—here A—that has a suitable angle of triangulation, while the other may have too small of an angle of triangulation with regard to vertex B. Only the image relevant to vertex A will be presented to the user with regard to verification and adjustment of the corresponding portion of the wireframe. In this situation, that 2D image will be identified as relevant to verification of vertex A, but not for vertex B. If a 2D image includes an angle of triangulation that is suitable for more than one vertex, for example both vertex A and vertex B, those images will be presented to the user as each of the respective vertices are being visually verified and adjusted by the user. In a situation in which multiple new vertices should be added to a unverified wireframe in the same area of the object of interest, the inventive systems and methods can provide the ability to add—that is, triangulate—multiple new vertices on a single set of 2D images in a single or in multiple processing steps to streamline the overall process. As long as the angle of triangulation of the multiple images is sufficient to resolve each new point, the same images can be used for these new points.

Unlike prior art methods that generally rely on user-directed selection of the point cloud for creation of wireframe vertices and for selection of those wireframe elements once created for verification and selection, in some implementations, the present invention can provide users with a systematic and logical workflow process within which to visually verify and adjust the various vertices and/or edges of a wireframe amongst and between various 2D images and/or a point cloud presented to the user during the verification process. The present invention can provide the ability to visualize the unverified wireframe and its constituent components (e.g., vertices and edges) both in the unverified wireframe and as the unverified wireframe is projected onto the one or more 2D images and/or a point cloud.

The visual perspective of seeing a component in 3D form in the unverified wireframe, in addition to the ability to see how it exists in 2D against one or more images of the actual object of interest or in 3D against the point cloud from which the unverified wireframe was derived, can enable the system to walk (or direct) the user around the structure or element of interest in a logical flow while presenting images for each vertex or area of the structure or element (e.g., bringing together 3D to 2D views to provide the capability for fast and accurate processing). The addition of 3D processing during verification also enables the user to identify holes or missing areas of the wireframe that need to be addressed in order for the wireframe generated from the visual verification and adjustment process to be accurate. In situations where addition of new vertices is indicated, or the entire wireframe needs to be constructed, the 3D presentation provides the ability to choose points in an intuitive manner, and the 2D images can provide the ability to accurately select or create the point on the actual structure or element of interest. Such user involvement in the verification of the unverified wireframe generates user confidence in the resulting output and any uses thereof.

The inventive process can substantially automatically provide, for logical presentation to a user, one or more 2D images and/or a point cloud that can facilitate verification so as to generate an accurate wireframe of all or part of a structure or element of interest. That is, 2D images or portions of a point cloud that are relevant to vertex A will be collected and presented to the user together. This can facilitate efficient visual verification of vertex A and any adjacent edges because all, or substantially all, of the 2D images relevant to vertex A and/or those portions of the point cloud that are relevant to vertex A can be presented to the user at the time that the wireframe elements corresponding to vertex A are being visually verified and adjusted.

Notably, how an adjustment to one aspect of a wireframe will affect another element of the wireframe is relevant in that a first adjustment may cause another wireframe element to become misaligned. By presenting the user with a logical selection of all or part of one or more 2D images or the point cloud sequenced as a workflow, user subjectivity can be reduced or even substantially eliminated, thus compressing the time needed to verify and adjust, if necessary, a unverified wireframe to generate a verified wireframe. Such verified wireframe and provides user confidence in the verified wireframe and any output and use thereof.

The unverified wireframe will be modified as the verification and any adjustment process proceeds. The original unverified wireframe (that is, the generated wireframe) and any subsequent modifications thereto can be maintained in memory. If mistakes are made during adjustment by the user, the changes can be discarded and the original unverified wireframe can be recovered. A wireframe undergoing adjustment will generate a plurality of wireframe variations prior to generation of the verified wireframe at the end of the verification and adjustment process. Each of the plurality of wireframe variations can, independently, be saved in memory for later recall or evaluation of each of the individual variations.

The invention herein also can be configurable to maintain a log of data regarding the distance of the user's manual adjustments for each vertex which can provide information related to the accuracy of the data that are used to generate the unverified wireframe. Such accuracy information can be utilized to generate improved algorithms and associated methods for use in generating wireframes automatically or semi-automatically for use at a later time.

In some aspects, the various verification and adjusting steps can be performed according to a timed sequence. For example, the process can be configurable to require the user to act on verification and adjustment of a unverified wireframe in relation to one or more 2D images and/or a point cloud in a predetermined time, for example, less than about 5 seconds or about 10 seconds or about 20 seconds or about 30 seconds per vertex, to be followed by the auto-advancing of the visual user cue (cursor or otherwise) to the next required verification element, such as the next roof vertex where the unverified wireframe undergoing modification is placed over a next relevant 2D image or over another part of the point cloud corresponding to that next roof vertex. Such auto-direction can facilitate quick and decisive action by users to enable them to meet production quotas. In some aspects, the user can override the auto-advance to enable the user to ensure that a verification and possible adjustment step is conducted accurately. Whether or not auto-advancing is enabled, the system tracks and logs and optionally reports time spent on each vertex, as well as any actions performed (e.g., adjustments, zooming/panning, etc.) Yet further, a sequence can be put on verification and adjustment that is based on a location and/or direction of points. For example, a user can start with the most northern vertex in the wireframe and adjust one by one till reaching the most southern vertex.

The verification and adjustment step can also be untimed, but once the step is completed, the process can be configurable to auto-advance to the next relevant 2D image and/or another location of a point cloud substantially without user input. The removal of the requirement of user input can improve the user's attention to the verification and adjustment of the unverified wireframe. In this regard, the user can be able to maintain focus on the unverified wireframe undergoing modification to generate a verified wireframe, which can further reduce the time required to obtain the associated verified wireframe in which the user has confidence.

In further aspects, the verification and adjustment process can be configured to execute in varying modes, however, the user may not be provided visibility to the underlying mode being executed at that time. That is, each of the verification and adjustment steps can be configured to align with an optimized workflow. The various operational modes can comprise one or more of the following (which are discussed in more detail in the workflow section hereinafter):

Inspection/Verification mode—the system is configured to allow user review of each vertex and edge. User can review fit of a unverified wireframe to a plurality of relevant 2D images and/or a point cloud, and user can select any vertex or edge on the wireframe undergoing verification and adjustment to see images related to that selected vertex or edge. This mode allows the user to verify a unverified wireframe through projected location of a desired vertex in different images and projected direction of all edges connected to that vertex in the same images. The combination of projected vertex location and projected edge directions generates sufficient mathematical constraints for a very high confidence output.

Adjustment mode—the system is configured to allow user review and adjustment of each vertex and edge.

Add element mode—the system is configured to allow user selecting a point in an wireframe to generate a new vertex or 3D point in the unverified wireframe; a related Connect mode allows a user to connect multiple vertices to created wireframe edge.

Create mode—the system is configured to generate a new wireframe or to add a new section to the wireframe by user selection of points and adjustment of corners.

Note that the names of the modes are exemplary and not meant to be fixed in name.

In some cases, areas of the structure or element of interest may be fully or partially occluded by other objects. In a non-limiting roofing example, this could happen when trees obstruct a portion of the roof and the generated point cloud including the structure or element of interest would not include that portion of the roof (but may include the tree) and thus the resultant unverified wireframe will not include that portion of the roof. In another example, a sign could obstruct a portion of the front of a building and the generated point cloud and the unverified wireframe will show the sign but not the building area behind the sign. In these and similar cases, the inventive methodology can automatically detect and highlight the occluded regions based on the potential discontinuities in the geometry of the structure or element of interest. Once these areas are detected, pre-defined or templated actions could automatically be implemented to compensate for the occluded areas. In case of a roof wireframe as a non-limiting example, this could translate into creating a new edge that is parallel to the opposing edge in the given roof facet and extending the new edge so that it intersects with neighboring edges. The inventive methodology can also enable the user to auto-extend and intersect the unverified wireframe edges to create a vertex. The inventive methods could then better ensure certain geometries are met such as the 3D point exists on the relevant plane(s). In other situations the user could choose points near the edge(s) of the obstruction(s) and specify to extend beyond that point to intersect. The system can then optionally indicate the properties of those extended edges and vertices as lower confidence or obstructed or some other defining term by coloring them a certain way or noting them with a mark or describing them as such either in the verified wireframe or 2D images or point cloud or output report or generated output formats.

The system is configurable, and options area laid out in logical easy-to-follow process, which may include one or more of the following characteristics:

Wireframe overlay on|off—if wireframe overlay is off, then tool acts in inspection mode, pick a point or edge and see zoomed images for that point or edge, if wireframe on, will see wireframe projected onto images Number of projection views to display—system can default to three projection displays—that is, relevant 2D images and/or point cloud over which a wireframe is projected in a single screen pass. If the user wants to verify wireframe characteristics during each verification step and/or after adjustment from more angles, the number of projections can be increased, such as to four. User can choose to show fewer projection views, one potential reason could be if unverified wireframes are very accurate and want to speed the process.

Inspection mode|Verification mode—inspection mode allows user to select any vertex or edge and will conditionally display zoomed images of that vertex or edge.

Automatic or Selection mode—when in verification mode and in automatic selection mode, the system starts at a vertex or edge and 'walks' user around entire structure or element of interest (e.g., the entire roof). This will present the user with each vertex or edge, followed by moving to next vertex or edge after adjustment, if necessary. Automatic selection mode can also be timed for auto-advancing based on time. Selection mode allows user to select vertices or edges for verification and adjustment in any order.

Input model(s): Filtered Dense|Dense|Edge|Sparse|Voxel|etc.—allows different point cloud types to be evaluated depending on data type and complexity. Primary flow is a filtered dense cloud, but for very large clouds, might want to enable edge cloud mode, and potentially sparse or voxel for further analysis or for debugging.

Manual|Automatic Projection Views—when in verification mode, automatic is default mode. Manual allows users to select which images/camera poses to use as projection views; this mode can optionally be turned on for one vertex or edges only in cases where auto-selection of projection views is not ideal and want to replace one or more of the views.

Zoom levels—system can be configurable to zoom to the highest zoom level without loss in sharpness; range can allow for 0-100% zoom.

Modules/Rules on/off—specific modules with specific functionality or rules enforcement can be enabled or disabled. For example, one rule could limit the adjustment or movement of a vertex or edge to a predefined surface (e.g., a planar surface that represents a roof facet).

The inventive tool can incorporate selectable modules that may comprise, among other things, properties, products, configuration, features, and constraints that apply to specific applications, group of functionality, type of industry, type of customer, or type of structure or other. For example, a module could be specific to flooring vs. roofing, commercial vs residential roofing, sloped vs low-sloped/flat roofing. The modules can contain many different types of information. In some embodiments, the information could be grouped or organized into properties, constraints, products, configuration or other types. The information in the module impacts many aspects of the system.

Examples of functionalities that could change, and thus be selectable, according to a given module are: application-specific standard labeling/terminology, algorithms to calculate pertinent geometrical properties (surface area, perimeter, angle), methods/rules to extract semantic properties (edge types, material type, manufacturer, heat transfer index, etc.), identify/label structure types, impose constraints, methods to extract metadata and shape data for specific products (e.g., 16" wide×20' long, standing seam metal panel, blue in color, wind uplift 100 mph, CRS 16 gauge), etc. Other examples include programmatic settings that the tool uses to perform automated feature extraction (e.g., a certain color threshold which is used for a feature like determining texture type). A module could also dictate a certain user interface by loading certain features (action buttons). Moreover, different types of constraints could be loaded to the tool based on the current active module including: 1) a geometric constraint that enforces or limits connectivity of an object to other objects; 2) a semantic constraint that enforces or limits semantic relationships among connected objects (e.g., an edge with a certain edge type cannot be connected to another edge with an edge type that does not conform to the first edge type); 3) constraints that describe relational connectivity (e.g., a floor object is enclosed by walls, a roof structure must be above ground plane, etc.); 4) constraints to enforce the structural integrity of a building or building element; 5) constraints for clash detection; and 6) constraints for detecting inconsistency among different levels of information.

In some aspects, verification and adjustment modules with differing functionality or rules enforcement can be enabled or disabled, in some implementations. For example, a Roofing-Construction module can comprise rules that confirm and enforce typical pitches and/or inner angles of a polygon representing a roof facet. Such a module could include functionality or parameters to turn on functionality like generating a DXF file from a button or automatically from the inventive tool. The system could also include rules specific to an industry or structure type.

Such rules can define allowed positionings during the unverified wireframe adjustment process. Such rules can further define prohibited positionings during the unverified wireframe adjustment process. Such rules can also define warnings or caution flags to the user during the unverified wireframe adjustment process. Prohibited positionings will be prevented from occurring as to attempted user adjustments that correspond to the prohibited positionings. If the intended user adjustment corresponds to a defined warning or caution flag, the user can be prompted to check her work to ensure the intended adjustment makes sense in context.

A rule-based model can be implemented once the adjustment is completed so that the verified wireframe can be verified to be geometrically valid according to construction rules and conventions (e.g., symmetry, inner and outer angles, length, slope, number of edges in a fact, connectivity among different facets, etc.). Still further, the verification and adjustment process, as well as the wireframe creation process, can be associated with a look-up table where geometric shapes (or "geometric primitives") are stored. The characteristics of a verified and adjusted wireframe—that is, a second or accurate wireframe—can be compared to the information in the look-up table to provide a further verification of the accuracy of the generated wireframe.

Such a rule-based model that incorporates geometric shape information can also be used during the verification and adjustment process to provide guidance to the user as the wireframe is being modified during the visual verification and adjustment process progresses. This guidance can facilitate decision making by the user, thus further reducing user subjectivity and potentially speeding up the verification and adjustment process from which the accurate wireframe is generated.

The system can be configurable to display a verification level or state in a status area or other named pane while a verification and adjustment activity is being conducted with an unverified wireframe. In non-limiting examples, information included in this status pane can include, for example, information about matters such as: status of wireframe loading or being saved, total vertex count; number verified; number remaining; percentage of wireframe complete; configuration options (e.g. zoom level, mode, etc.). Summary reports can also be generated for each verified wireframe, and its associated structure or element (e.g., roof, door, building, etc.). In non-limiting examples, these summary reports can include data such as all data generated during the session, including number of vertices; number adjusted; amount adjusted (e.g. average/minimum and maximum per unit time); edges adjusted (e.g. average/minimum and maximum per unit time); number of new vertices created; time on vertex (e.g. average/minimum and maximum per unit time); areas per plane/total area; time in model; listing of each corner with statistics for each vertex, etc. The data associated with these and other status characteristics can be used to create activity reports for each user, such as to evaluate her productivity, error rate, etc.

A variety of data structures can be incorporated during processing. These can include the following as well as others:
  Corner image identification, sequence number, initial location, new location, time in focus, number of available views, status (e.g., needs to be viewed, has already been verified, number of times viewed, number of times adjusted), etc.
  User action log—for example, every step a user makes or action a user takes can be recorded to assist in streamlining processes in generating process improvements
  Session—point cloud name/size, total vertices, number of vertices verified, number of vertices created, time in session, configurations parameters for session, etc.

Various features can optionally be incorporated into the methodology herein. For example, the process and system can be configurable to take and record snapshots (e.g., part of the relevant 2D images and/or point clouds where vertices or edges or surfaces were incorporated) of all verified vertices or edges or surfaces of the unverified wireframe and any adjustments thereto. Each verified wireframe can also be recorded as snapshots. All or some of such recorded snapshots can be used in other processes, such as the training of machine learning algorithms that can be used in future applications where additional automation may be indicated using such trained algorithms. Such information can also be used to support training of users or audits of completed verified wireframe generation processes.

Further features can optionally incorporate a mode that limits a user to create a vertex or edge only in places that a corresponding 3D data exists in the 3D representation of the structure or element of interest. While adjusting in such a scenario, the user could drag a vertex or edge to a pixel that is not associated with an accompanying 3D data and the system can be configured to triangulate based on those image coordinates and create a new vertex or edge. This new vertex or edge can be generated by the system according to geometrical rules associated with distance to a 3D plane that is acceptable. Optionally, the new vertex/edge or to be created vertex/edge could be evaluated in association with shapes located in a look-up table as discussed elsewhere herein. The triangulation process could be performed in real-time and hence the user could see the impact of adjusting the location of a vertex/edge in an image by immediately noticing the movement of the vertex/edge in 3D or movement of the projected vertex/edge in other 2D images. If triangulation is found to be a resource-intensive process, the system can be configurable to restrict the triangulation frequency.

Yet further, individual surfaces/polygons in an unverified wireframe can be highlighted so that the adjustments will only be applicable to the surface/polygon of interest. In this regard, the system can be configurable so that the adjustments will not propagate beyond affecting that surface/polygon. In some implementations, this can be accomplished at the vertex level by not connecting (or deleting) vertices to the different polygons.

Vertex or other feature highlighting in the wireframes can also be configurable in the systems and methods herein. In this regard, the highlights can be identified, such as by circling or marking each wireframe so it is apparent to the user where she should select when in the selection mode. A check mark or other signal can be placed in the circle or mark or in place of the circle of mark when the user completes the verification of that aspect of the wireframe. For corners that are added by a user, the software can be configured to indicate they are not yet connected. Other forms of highlighting can also be used to assist the user in verification and adjustment.

Additional features can be incorporated in the process to deal with different types of penetrations or conditions that might exist in a structure. These features could include automatic detection of penetrations or conditions in roofing, for example, or regions of interest both in the 3D representation of the structure and the 2D imagery taken from that structure. Computer vision, image processing, and/or machine learning algorithms could be used to detect and identify such regions if the algorithms were trained for those specific regions. In case of a new region type that prevents automatic detection and identification algorithms to perform accurately, the user might manually select a region of interest. The algorithms then automatically extract distinctive 2D and/or 3D features from that area and look for the same features in other parts of the 3D representation data and/or 2D imagery so that they detect and identify any other areas with similar features. As a non-limiting example, the user can select an air conditioning unit (a condition) in an image from a commercial roof structure. Once selected, the algorithms will extract features from that region and as a result will be able to detect and identify all other similar air conditioning units on that roof both in 2D and 3D datasets.

Machine learning algorithms can be trained using information generated in the verification process, as well as any downstream applications that utilize the verified wireframe and any output generated therefrom. For example, a training set can be used in conjunction with machine learning algorithms in assigning properties and property weights, where "weights" refers to the confidence or significance assigned to a given property associated with one or more aspects of the unverified wireframe and generation thereof, one or more aspects of user's actions during the verification process, aspects associated with the information and functions presented to the user during verification, or use of the output.

Each machine learning model will be trained following the traditional supervised learning approach or a more recent unsupervised learning approach. As previously established, a training set of the data can be incorporated into instructions associated with subsequent verification operations. Training then involves allowing the algorithm to take in the input information and learn the necessary model parameters that will associate the input features or appearances to their corresponding label via the algorithm. Examples of such algorithms include, but are not limited to the use of SVMs (support vector machines), randomized decision forests, convolutional neural networks and adaboost. Each of the aforementioned algorithms can be optimized according to their respective loss functions. A non-limiting example of a general loss function is $\mathrm{argmin}_\delta \max_{\theta \in \Theta} R(\theta, \delta)$. It is commonly referred to as the min-max loss function. It determines the best δ minimizes the maximal possible loss θ. Other qualifying methods can be employed to evaluate the performance of the system. These include but are not limited to the system's accuracy, recall, and error. Such methods can be employed to improve the robustness in the algorithm's predictive capabilities by means of cross-validation.

Multiple machine learning models can be trained and used. This is referred to as a "mixtures of experts" or "ensemble," where each model is trained on all or part of the training data. Furthermore, an additional layer of logic can be applied to the outputs of each method to determine a weighting function that would give priority based on the performance of each method.

In some aspects, therefore, the new additions to the training sets can be made from the verification processes for the unverified wireframes that are predicted via one or more machine learning algorithms and can be validated with light supervision in which a human may readily "eye-ball" the results to confirm correct results or throw out bad results. As the machine learning algorithms are further trained as to type and characteristics of the structure or element of interest, the wireframe verification process can become substantially unsupervised, as per the semi-supervised approach. This can greatly accelerate the generation of verified wireframes of structures or elements of interest. Even with substantially unsupervised processes, from time to time, a human, optionally, can be used to validate at least some of the automatically object predictions. Over time, the machine learning algorithms can learn characteristics of one or all of the wireframe generation rules, user operation, workflow and the like with light supervision or even substantially without the need for human supervision, and the resulting information can then be used to perform efficient and accurate object recognition-related activities for newly provided object recognition information, even those for which little or no substantive information about the object or structure of interest is known beforehand, as long as the information relevant to the wireframe generation and subsequent processing steps are collected, recorded and included the training set used with the machine learning algorithms. Such machine learning algorithms can be updated from time to time or continuously to result in further improvements in the processes and output related thereto. As would be recognized, the machine learning predictions can be improved through continuous updates in the training in both a supervised and semi-supervised manner along with additional training for the models on the additional information. Thus, it is anticipated that, over time, inclusion of new information generated from the methodology herein will improve subsequent verification operations.

The fully or partially adjusted unverified wireframes generated according to the methodology herein can be utilized to generate CAD information files that can be utilized to create, for example, 3D models of a location where such models may be used to generate architectural, construction, engineering, and other documentation related to a construction project. Both interior and exterior survey and measurement information can be provided for use for these purposes, as well as for creating content for a virtual reality model or digital asset or other component of a virtual reality experience.

The inventive systems can provide a wide variety of presentation styles and formats of resultant verified wireframe or information associated therewith. Consumers of this information can be in the form of a user or a computer system. Users typically focus on visualization, layout, the type of data, sometimes coupled with a need to modify the data to fit the user's expectation. Systems sometimes require a focus on the mechanism (in nonlimiting examples, API, cut and paste, monitored eFolder), the language of the data (e.g., CSV, XML, geoJSON, JSON, free form), the schema (structure of the metadata/element type) and the data type format of the data itself (e.g., string, enums, etc.). In on embodiment the output can adhere to industry accepted or standard formats such as, e.g., DWG, DXF, STL, or others. The system also can provide as output the visualization of the verified wireframe in a 3D view. The transmit method can occur in different ways to support different application needs by the user. The full 3D view could be transmitted by uniform resource locator (URL) via an email or text. The URL approach would allow the user to open and view the 3D View. Large file sizes like a 3D point cloud may involve web chunking of the data to provide visualization of the point cloud prior to the entire data set being downloaded. The system can also provide a read only 3D view that limits users to rotate, pan, zoom to visualize different aspects of the 3D model. This "read only" approach would not support changes to the structural data. Much like a printed output or output in the form of an immutable PDF file, the integrity of the results cannot be changed by the user.

The system can also provide an animation capability to inject an animation sequence into the output to better control the experience for the user, possibly ensuring the optimal visibility from a prescribed set of angles. The system can provide real time data access by enabling embedding of the 3D view into a users' application or web site that accepts refreshable data feeds. The system can provide the output in printable form, for example as PDF or image or import into a word processor or other presentation tool. The system can support bindable data structures to enable potential combination data of output data with user provided data. This would support customizable representation of the output, possibly adding user branding, generating estimates, or other forms of reporting. Furthermore, the output could be segmented or classified to output a specific set of conditions or types of structures.

When a roofing-related information is the desired output, the output could consist of a roofing report, a gutter report, a siding report, a volume/square footage report, paint report, cost estimation, or other report. The system can also output the data in a raw format, thus enabling downstream calculations to create new data. In this approach the system could output the data in a 2D tabular format (like CSV, EXL) or formatted data (JSON). When processed according to the inventive methodology herein, verified wireframes of the structures or elements are substantially accurate as explained elsewhere herein.

Workflows for the inventive systems and processes can be exemplified by the below-described steps that are presented in relation to generating a verified wireframe for a roof as a non-limiting example:

An example of the verification process is illustrated below. The below process can be conducted using a computer, tablet, smartphone, or other appropriate computing device.

Vertex Verification and Adjustment Workflow, a Roofing Example:

User clicks on link, browser or display view, which can open with:
 Overlay model of, e.g., a house with a unverified wireframe (possibly just roof planes with the unverified wireframe, or possibly an orthogonal with the unverified wireframe). The overlay model is the point cloud in a 3D viewer with or without the unverified wireframe displayed.

Projection views of a first roof corner to evaluate that corner/vertex (e.g., 3 or 4 frames zoomed to the corner, with a corresponding unverified wireframe vertex and edges projected onto a 2D image or photo). Projection views are the 2D images with the wireframe projected correctly into the 2D image and/or a point cloud from which the unverified wireframe was derived. Or cases when creating the unverified wireframe, the 2D images/point cloud related to the point chosen in the 3D model.

The user can evaluate model, zoom, pan, select a different corner/vertex to verify/adjust alignment of the unverified wireframe with that corner/vertex (e.g., bring up Projection Views for that corner).

System can then move to the next roof corner in the sequence.
    Corner being addressed is highlighted/marked in the overlay view.
    User reviews each Projection View,
    if the unverified wireframe vertex being verified aligns exactly on corresponding roof corner as pictured in the 2D image or as shown on the point cloud comprising corresponding roof corner, user indicates that no action is required;
    if vertex does not align exactly with corresponding roof corner in the 2D image and/or point cloud, user moves wireframe vertex with mouse or via touch screen with finger or pen to align wireframe vertex with corresponding roof corner.
        The system can move the roof corner to an existing 3D point or triangulate to create a new 3D point.
        The vertex moves accordingly in each of the other visible Projection Views.
        The movement is logged (distance, angle, etc.).
    System logs time spent on vertex.

User clicks "Next" to proceed to next corner/set of Projection Views.

Once all corners in sequence are reviewed (and adjusted, if necessary):
        User indicates that sequence is done (such as by clicking "complete" or similar in a screen dialogue, or just by completing the last vertex in the sequence).
        System can record that the unverified wireframe has been adjusted along all relevant views to generate the verified wireframe.
        System can record total time user spent verifying and adjusting each unverified wireframe to generate the verified wireframe.
    Alternative: User can click "Next" to restart sequence or select "Back" or similar instructions to revisit the sequence.
    Alternative: User can click on another vertex to review If triangulation is determined to require substantial resources, an alternative path can be:
    if unverified wireframe vertex is not exactly on roof corner of 2D image or at the relevant part of a point cloud, the user can move the vertex with, e.g., a mouse or via a finger/stylus, that either:
        'snaps to grid' to a 3D point on the roof corner; or
        free form moves to a visual roof corner (possibly indicating via holding down shift key or clicking free-form button).
            The system can triangulate the new 3D point on the vertex, and projects the point on all Projection Views.

Add vertex workflow:
    Reviews fit and completeness of wireframe on Overlay Model:
        If corner is missing, user zooms into model and selects point on model to add 3D point.
            System displays Projection Views of point selected with point back projected into the views, user adjusts point to lay on corner across views.
            Once point created, user can continue adding 3D points, or exit the add mode.
            Once complete, user can enter Connect mode and select sequence of corners in model to connect with new lines.
            Lines are drawn as corners are selected.
        User can enter Delete mode to delete lines or points.

Inspection Mode
    User can evaluate model, zoom, pan, select a point or corner to view, and the Projection Views are displayed for that point.
    In one mode, camera pose views are displayed above model and user can select which views should go in Projection Views.
    In one mode, when point is selected on a plane the plan is highlights in the 3D model and the information (e.g., area, diameter, time, etc.) area of the plane can be displayed in the Status Pane.

Data and logs associated with the unverified wireframe generation, verification and/or adjustment session can be stored locally by the user or all or some aspects of the inventive process can be stored in the cloud, together or separate from wireframe and point cloud data.

The inventive system provides alternative ways to inspect or visualize aspects of the unverified wireframe of the structure or element of interest. As described earlier, the system can provide a stacked layer view in which different information or aspects are provided as layers on top of other layers or objects. In this view the user can see how the layers relate (e.g., when referenced/scaled to the same coordinate system) such as to project the unverified wireframe on top of a point cloud, project dimensions on top of a wireframe or point cloud or other 3D structure, project a conditions layer on top of a wireframe or point cloud or other 3D structure. Additionally, the system can provide layered lines or vertices or other structural components. The layering approach enables a user to select or deselect a specific layer or set of layers. This capability can be extended to support groups of components, possibly connected to form polygons, and enable the user to move or investigate polygonal regions.

In further implementations, the verification methodology herein can provide a view in which one aspect of the structure or element of interest is projected onto another view of the structure of interest. This can be represented by projected aspects of the unverified wireframe onto the 2D image(s) and/or point cloud or the 2D images onto the wireframe. For example, the vertices from the unverified wireframe can be projected onto one or more 2D images. Similarly, one or more of the 2D images could be projected onto either or both of the first or verified wireframe in order to provide a photo-realistic aspect to the presented information. The system can enable movement of the projected image that provides a smooth transition and seemingly photo-realistic representation of the information presented to the user.

The inventive system can provide a horizontally layered view in which two structures of interest or portions of the same structure or element of interest are presented side by side. Both layers can be seen at the same time, which can enable comparisons between the layers. If there is a time aspect related to a structure, for example the date or time when the representation was created, the system can provide a time based comparison across the layers. For example, if verified wireframe A reflects the state of the structure at time 1 and the verified wireframe B represents the state of the structure of time 2, then the system enables comparison of the structure across the timeframe. The system can be configured to provide more than two horizontal layers, in further implementations.

The inventive system can also provide a merged view in which it can represent two different integrated representations (e.g., wireframe, point cloud, image, model, etc.) and optionally highlight the similarities or differences on the layers. For example, the system could merge a point cloud representing the as-built structure with a model representing the as-designed structure, and highlight the differences or similarities in the two representations. Other examples include merging a layer generated point cloud with a photogrammetry generated point cloud, or merging point clouds representing different parts of a structure or set of structures. Merging point clouds is also called "registering."

In other aspects, the invention can provide a view optimized for quick visualization of the overall structure of the wireframe or underlying structures as well as verification of accurate placement of wireframe vertices, edges, and properties on the different representations of the structure. This can be used to quickly validate the status of the unverified wireframe at different stages of the verification process, including but not limited to after the system generates a unverified wireframe, after a manual QA process is applied, or after a ground truth version of the wireframe is created. This view can comprise in some embodiments the unverified wireframe optionally projected in 2D over the 2D flattened view of a 3D structure (e.g., point cloud, mesh, BIM Model, etc.) or over a 2D image or over a 2D orthomosaic image. This view can be optimized to ensure the structure is intact, properties (e.g., like edge type, condition type, etc.) are assigned correctly and that there are not extra vertices or missing vertices. The system can display zoomed and possibly cropped images from one or more views of each vertex on the structure or element of interest. Such a view can enable the user to quickly view each vertex and know that it has been properly placed onto the exact position of that features/corner on the images. The view can take the form of a grid. The presentation to the user can be optimized to present all or substantially all cropped images and set of vertices in a consolidated view for quick visual processing. In such cases the system can allow for application of a quality assurance process for as little as 5 seconds or 10 seconds or 20 seconds or 30 seconds or 1 minutes or 2 minutes.

In some cases, the one or more 2D images presented to the user can be placed in a grid format. In cases in which the projected vertices are not representative of as-built the user can press a control related to the image to enter the inventive tool optionally opened up to that vertex in adjust mode. The verification process can be configured to present only 2D images or parts of the point cloud containing features or elements that were marked or otherwise noted by the user as requiring adjustment in the unverified wireframe. Such quick view system provides controls to indicate that the wireframe has been verified and, therefore is accurate and having user confidence.

In some aspects, the adjusting or points in the wireframe can be considered "rough adjustment" and could be in a 20 cm range or accuracy, or 10 cm, or 5 cm, or 2 cm. The process involves confirming the unverified wireframe is substantially complete at the start of the verification process, such as having no missing edges and no missing parts of the structure or element of interest. To accomplish this the system is configured to allow the user to zoom, rotate, manipulate vertices, edges and surface areas (using, e.g., Create, Update, Delete) in a 3D mode. Once the unverified wireframe is structurally sound each vertex can be verified in the correct location by projecting a vertex on the corresponding image or corresponding location on the point cloud.

The inventive systems can provide an improved approach to conducting accuracy studies. Typically, accuracy studies involve one party measuring a scene using a first methodology, e.g., tape measure, documenting the results, and a second party measuring the same scene with a second methodology, e.g., laser scanner or drone capture, etc., and then comparing the results. Such accuracy studies can often be limited in effectiveness because it can be difficult to determine whether the measurements were taken from the same endpoints in the structure or element of interest. Without removing or reducing that endpoint uncertainty, there can be lower user confidence in the accuracy study results. One way to reduce this uncertainty is to mark the scene and ask both parties to set their measurement endpoints on those marks. Sometimes the scenes cannot be reliability marked (difficult materials, customer not allowing marks, etc.). Additionally, there still is issue of confirming that the measurements were actually taken from those endpoints.

In regard to such accuracy studies, the inventive processes and systems enable improvements in accuracy studies. For example, in the case of accuracy study comparing drones to hand measurements, the improved approach would be a "fly first and verify" approach. A structure or element of interest having structural features of interest is selected. A drone would then be used to acquire a plurality of images of the structure or element of interest. A wireframe would then be generated and verified according to the methodology herein. A report would then be generated with information that indicates in the associated images exactly where each endpoint was taken for each measurement or other relevant output derivable from the wireframe. This report or worksheet could be produced before a worker (e.g., a surveyor) begins measuring the structure or element of interest in person. The report or worksheet can then be used as a template to capture measurement information in person and to confirm that the in-person measurements conform to the corresponding information generated from the images. This would enable the person visiting the site to pick the exact same endpoints so as to better understand the accuracy of the image-derived measurement information. If the measurements that are provided on the report are accurate, that fact could be noted and such information could be provided for use. If the in-person derived measurements are not the same, the person taking the in-person measurements could generate further information about the reasons why the measurements do not match. Information generated from such accuracy studies can be used to improve the overall verification process, such as being incorporated into machine learning or user training modules.

Referring to FIG. 1, shown is a flow diagram illustrating an example of a wireframe verification process 100. Beginning at 103, 2D images of a structure or element of interest are provided that are derived from one or more single passive image capture devices. The 2D images include overlapping 2D images with one or more structural aspects of the structure or element of interest, and can alternatively be derived from video. In addition, 3D representations of the structure or element of interest are provided at 106. The 3D representation can comprise or be derived from, e.g., point cloud information, surface mesh information, computer aided design (CAD) model information or building information modeling (BIM) model incorporating the structure or element of interest.

At 109, an unverified wireframe is generated from the 2D images and/or the 3D representation. The unverified wireframe can be projected on 2D images, 3D representations, or a combination of both. The 2D images used for verification of the wireframe can include 2D images that were used to generate the unverified wireframe. In some cases, the 2D images used for verification of the wireframe are separate from the 2D images used to generate the wireframe (or a point cloud used to generate the wireframe). With the wireframe projected over the image or point cloud at 112, endpoints and edges can be compared to features of the underlying 2D image or 3D representation to ensure confidence in the final verified wireframe. If adjustments are made at 115, then the changes can be propagated through all of the 2D images used to verify the unverified wireframe at 118. Confirmation of whether additional 2D images are available for verification can then be checked at 121. If there is not adjustment, then the workflow passes to 121.

If there is another 2D image or 3D representation that is being used for verification, then the workflow returns to 112 where the unverified wireframe is projected on the next 2D image or 3D representation. The comparison of the unverified wireframe can, in some implementations, continue until verification with all of the 2D images and/or 3D representation is complete at 121. Alternatively, the verification can be completed after only some, such as one or one or more of the 2D and/or 3D representation is complete at 121. At that time, the verified wireframe is produced at 124. The verified wireframe can be used with a high level of confidence. As noted, the verified wireframe is not necessarily an accurate wireframe, but the user will nonetheless have confidence that the verified wireframe and any associated output is or is not accurate.

Figure 2:
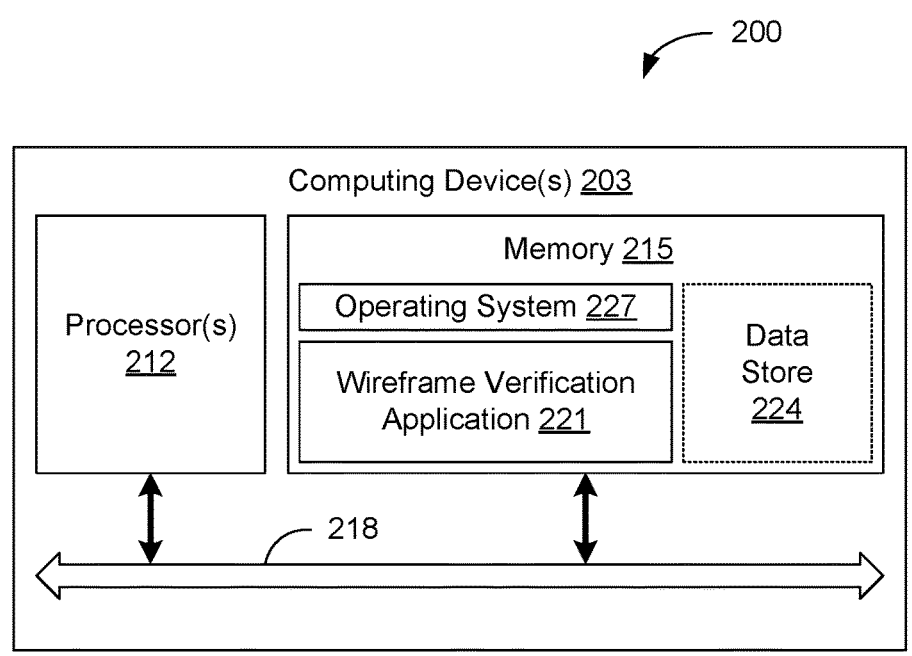
FIG. 2 is a block diagram illustrating an example of a machine that can be used for wireframe verification, in accordance with various aspects of the present disclosure.

Referring now to FIG. 2, shown is an example of a machine 200 that may be utilized for the wireframe verification methodology disclosed herein. The machine 200 can be a computing device 203 or other processing device, which includes at least one processor circuit, for example, having a processor 212 and a memory 215, both of which are coupled to a local interface 218. To this end, the computing device(s) 203 may comprise, for example, a server computer, mobile computing device (e.g., laptop, tablet, smart phone, etc.) or any other system providing computing capability. The computing device(s) 203 may include, for example, one or more display or touch screen devices and various peripheral devices. Even though the computing device 203 is referred to in the singular, it is understood that a plurality of computing devices 203 may be employed in the various arrangements as described above. The local interface 218 may comprise, for example, a data bus with an accompanying address/control bus or other bus structure as can be appreciated.

Stored in the memory 215 are both data and several components that are executable by the processor 212. In particular, stored in the memory 215 and executable by the processor 212 include a wireframe verification application 221 and potentially other applications. Also stored in the memory 215 may be a data store 224 and other data. The data stored in the data store 224, for example, is associated with the operation of the various applications and/or functional entities described below. For example, the data store may include databases, object libraries, and other data or information as can be understood. In addition, an operating system 227 may be stored in the memory 215 and executable by the processor 212. The data store 224 may be may be located in a single computing device or may be dispersed among many different devices. The components executed on the computing device 203 include, for example, the wireframe verification application 221 and other systems, applications, services, processes, engines, or functionality not discussed in detail herein. It is understood that there may be other applications that are stored in the memory 215 and are executable by the processor 212 as can be appreciated. Where any component discussed herein is implemented in the form of software, any one of a number of programming languages may be employed.

A number of software components are stored in the memory 215 and are executable by the processor 212. In this respect, the term "executable" means a program file that is in a form that can ultimately be run by the processor 212. Examples of executable programs may be, for example, a compiled program that can be translated into machine instructions in a format that can be loaded into a random access portion of the memory 215 and run by the processor 212, source code that may be expressed in proper format such as object code that is capable of being loaded into a random access portion of the memory 215 and executed by the processor 212, or source code that may be interpreted by another executable program to generate instructions in a random access portion of the memory 215 to be executed by the processor 212, etc. An executable program may be stored in any portion or component of the memory 215 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 212 may represent multiple processors 212 and the memory 215 may represent multiple memories 215 that operate in parallel processing circuits, respectively. In such a case, the local interface 218 may be an appropriate network that facilitates communication between any two of the multiple processors 212, between any processor 212 and any of the memories 215, or between any two of the memories 215, etc. The local interface 218 may comprise additional systems designed to coordinate this communication, including, for example, performing load balancing. The processor 212 may be of electrical or of some other available construction.

Although the wireframe verification application 221, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the wireframe verification application 221, that comprises software or instructions can be embodied in any non-transitory computer-readable medium for use by or in connection with an instruction execution system such as, for example, a processor 212 in a computer system or other system. In this sense, the logic may comprise, for example, statements including instructions and declarations that can be fetched from the computer-readable medium and executed by the instruction execution system. The flow diagram of FIG. 1 shows an example of the architecture, functionality, and operation of possible implementations of a wireframe verification application 221. In this regard, each block can represent a module, segment, or portion of code, which comprises one or more executable instructions for implementing the specified logical function(s). It should also be noted that in some alternative implementations, the functions noted in the blocks may occur out of the order noted in FIG. 1. For example, two blocks shown in succession in FIG. 1 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Communication media appropriate for use in or with the inventions of the present disclosure may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described above, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A method of generating a verified wireframe of a structure or element of interest comprising:
    generating, by a computer or a user, an unverified wireframe corresponding to at least part of a structure or element of interest comprising one or more structural aspects of interest, wherein:
    the unverified wireframe:
        is derived from a plurality of overlapping 2D images of the structure or element of interest, wherein the plurality of overlapping 2D images are generated from a passive image capture device, and incorporates one or more structural aspects of the one or more structural aspects of interest; and
        comprises one or more unverified wireframe features that correspond to the one or more structural aspects; and
    projecting the unverified wireframe over either or both of:
        one or more 2D images selected from the plurality of overlapping 2D images, wherein each of the one or more selected 2D images incorporates at least some of the one or more structural aspects; or
        a point cloud derived from the plurality of overlapping 2D images, wherein the point cloud incorporates at least some of the one or more structural aspects; and
    adjusting, by either or both of the computer or user, at least part of the unverified wireframe, wherein the adjusting is by alignment of at least one unverified wireframe feature of the one or more unverified wireframe features with a corresponding structural aspect visible in each of the one or more selected 2D images or the point cloud over which the unverified wireframe is projected, or
    indicating, by either or both of the computer or user, acceptance of the unverified wireframe without adjustment,
    thereby generating a verified wireframe comprising all or part of the structure or element of interest, wherein measurement information can be derived from the verified wireframe, and wherein the measurement information is less than 5% different from an actual measurement value for the corresponding structural aspect.

2. The method of claim 1, wherein the structure or element of interest comprises all or part of a roof, and the one or more structural aspects of interest comprises a roof area, a roof corner, a roof pitch, a roof edge, a roof gutter, a roof gable, a dormer, or a skylight.

3. The method of claim 1, wherein at least part of the adjusting is conducted by the user and a plurality of selected 2D images are selected from the plurality of overlapping 2D images for presentation to the user, wherein each of the plurality of selected 2D images are selected by the user or the computer to present a different view of the one or more structural aspects of interest to the user.

4. The method of claim 3, wherein, when the user aligns the at least one unverified wireframe feature with the corresponding structural aspect on a presented 2D image of the plurality of selected 2D images, modifications to the wireframe resulting from the alignment are visible to the user on at least one other presented 2D image in the plurality of selected 2D images.

5. The method of claim 1, wherein the measurement information is less than 1% different from the actual measurement value for the corresponding structural aspect.

6. The method of claim 1, wherein:
the adjusting step is associated with one or more rules associated with the one or more structural aspects of interest; and
each of the one or more rules defines an allowed positioning for the one or more structural aspects, a prohibited positioning for the one or more structural aspects, or both an allowed and a prohibited positioning for the one or more structural aspects.

7. The method of claim 6, wherein:
when a user generated adjustment conforms to the allowed positioning for that structural aspect the adjustment will be maintained by the computer; or
when the user generated adjustment conforms to the prohibited positioning for that structural aspect the adjustment will be rejected by the computer.

8. The method of claim 1, wherein a wireframe verification process is generated by the user, and during the projection and adjustment steps either or both of visual or audible instructions are provided to the user by the computer.

9. The method of claim 1, wherein information about one or more of the projection or the adjustment of the unverified wireframe is collected by the computer for incorporation into a machine learning process.

10. A system, comprising:
at least one computing device comprising a processor; and
a wireframe verification application stored in memory, where execution of the wireframe verification application by the processor causes the at least one computing device to:
generate an unverified wireframe corresponding to at least part of a structure or element of interest comprising one or more structural aspects of interest, wherein the unverified wireframe:
is derived from a plurality of overlapping 2D images of the structure or element of interest, wherein the plurality of overlapping 2D images are generated from a passive image capture device, and incorporates one or more structural aspects of the structural aspects of interest; and
comprises one or more unverified wireframe features that correspond to the one or more structural aspects; and
project the unverified wireframe over either or both of:
one or more 2D images selected from the plurality of overlapping 2D images, wherein each of the one or more selected 2D images incorporates at least some of the one or more structural aspects; or
a point cloud derived from the plurality of overlapping 2D images, wherein the point cloud incorporates at least some of the one or more structural aspects; and
adjust at least part of the unverified wireframe, wherein the adjusting is by alignment of at least one unverified wireframe feature of the one or more unverified wireframe features with a corresponding structural aspect visible in each of the one or more selected 2D images or the point cloud over which the unverified wireframe is projected, or indicate acceptance of the unverified wireframe without adjustment,
thereby generating a verified wireframe comprising all or part of the structure or element of interest, wherein measurement information can be derived from the verified wireframe, and wherein the measurement information is less than 5% different from an actual measurement value for the corresponding structural aspect.

11. The system of claim 10, wherein the unverified wireframe is generated based upon user input.

12. The system of claim 10, wherein at least part of the adjusting is conducted based upon a user input and a plurality of selected 2D images are selected from the plurality of overlapping 2D images for presentation to the user, wherein each of the plurality of selected 2D images are selected by the user or the computer to present a different view of the one or more structural aspects of interest to the user.

13. The system of claim 12, wherein, when the user aligns the at least one unverified wireframe feature with the corresponding structural aspect on a presented 2D image of the plurality of selected 2D images, modifications to the wireframe resulting from the alignment are visible to the user on at least one other presented 2D image in the plurality of selected 2D images.

14. The system of claim 10, wherein:
the adjusting step is associated with one or more rules associated with the one or more structural aspects of interest; and
each of the one or more rules defines an allowed positioning for the one or more structural aspects, a prohibited positioning for the one or more structural aspects, or both an allowed and a prohibited positioning for the one or more structural aspects.

15. The system of claim 14, wherein:
when a user generated adjustment conforms to the allowed positioning for that structural aspect the adjustment will be maintained by the wireframe verification application; or
when the user generated adjustment conforms to the prohibited positioning for that structural aspect the adjustment will be rejected by the wireframe verification application.

16. The system of claim 10, wherein the wireframe verification application presents either or both of visual or audible instructions to the user during the projection and adjustment steps.

17. The system of claim 10, wherein information about one or more of the projection or the adjustment of the unverified wireframe is collected by the wireframe verification application and stored in the memory for incorporation into a machine learning process.

18. The system of claim 10, wherein the indication of acceptance is based upon a user input.

* * * * *